Aug. 29, 1939.　　　F. E. MAIER　　　2,171,185
LONGITUDINAL SPRING FOR TELESCOPIC TUBULAR GUIDES
Filed Dec. 16, 1936
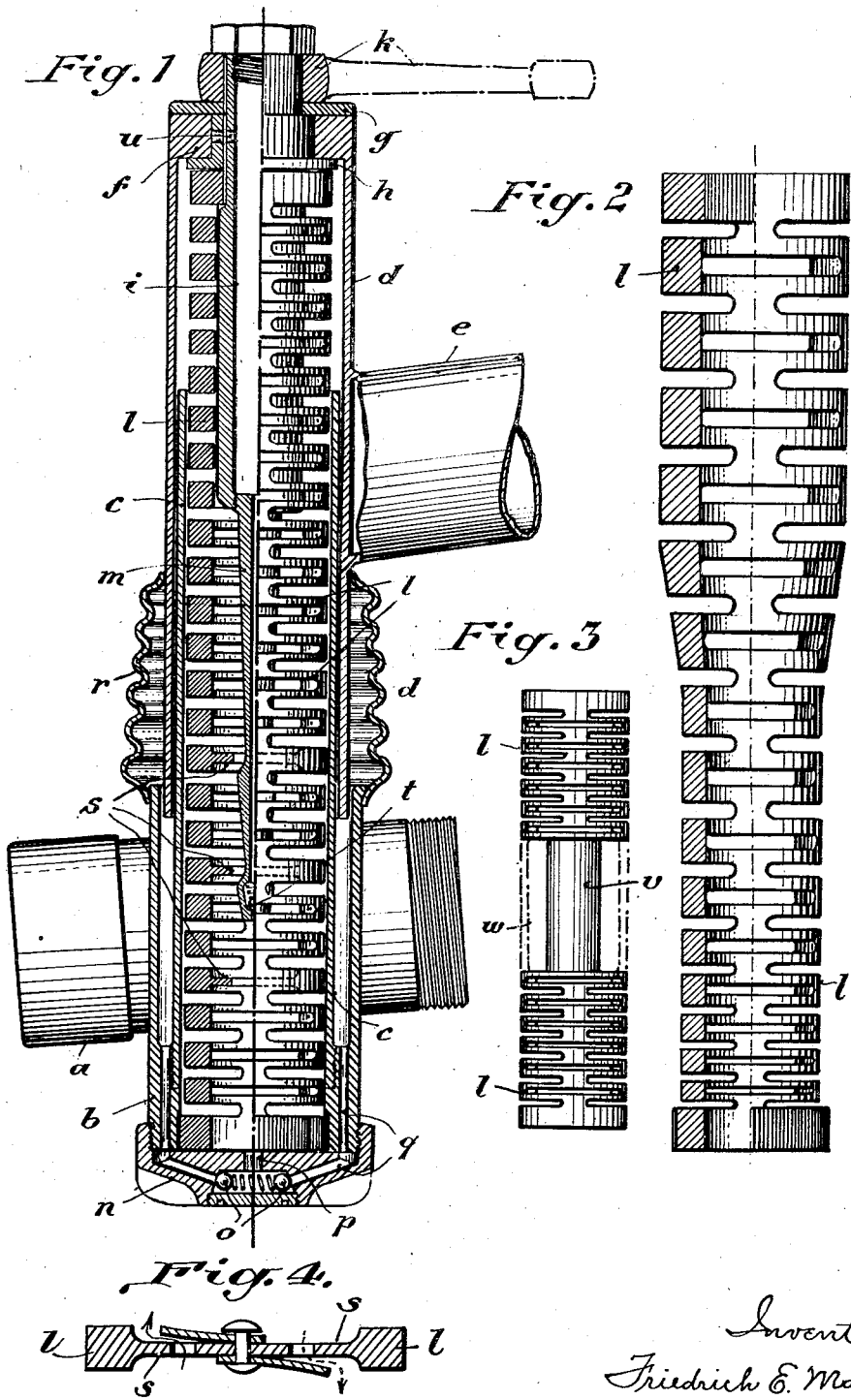

Patented Aug. 29, 1939

2,171,185

UNITED STATES PATENT OFFICE 2,171,185

LONGITUDINAL SPRING FOR TELESCOPIC TUBULAR GUIDES

Friedrich Eugen Maier, Berlin-Charlottenburg, Germany

Application December 16, 1936, Serial No. 116,213
In Germany December 18, 1935

14 Claims. (Cl. 267—61)

The present invention relates to longitudinal springs for telescopic tubular guides and more particularly for guides of this type intended for wheel supports. In telescopic tubular guides as disclosed by my pending application Serial No. 51,820, filed November 27, 1935, the several guiding members to be displaced relatively to one another under the pressure of a spring must be so coupled that they are prevented from rotating with respect to one another. "Guiding" is in this construction thus not restricted to the control of the longitudinal sliding movement of the two guiding members but also involves some control intended for holding the said two guiding members in exactly the same axial position during their oscillation. There are many instances of use where identical or similar operating conditions are prevailing.

So far, the two problems coordinated in the present instance have been resolved by two distinct mechanical expedients. Apart from the usual arrangement of the longitudinal guiding surfaces there were provided special means for preventing the angular displacement which means are, on account of the necessary unlimited preservation of the mobility in a lengthwise direction, rather expensive as to manufacture and maintenance (lubrication) these means consisting, e. g., in polygonal cross sections of the guides or in slots in which guiding pins are caused to slide.

The object of the present invention is to simplify the manufacture as well as the operation of such guides in the case that longitudinal springs are used for yieldingly connecting the two operative members of guides of this class, and it is a feature of the invention that to this end the longitudinal spring is so designed that it is resistive to torsion about its longitudinal axis. Such a spring at first performs its customary duty, viz. to yieldingly connect the two guiding members under variable loads and in different relative positions. Moreover the twist resisting connection of either extremity of the said spring to the guiding member concerned is, together with the said resistance to torsion of the spring itself, utilized for so holding the said two guiding members that they are prevented from angular displacement relatively to each other. Thus, special means as heretofore used for preventing such angular relative displacement of the members within the longitudinal guides may be dispensed with. The longitudinal guide may therefore be designed as a normal cylindrical body cheaply obtained by simple turning on a lathe. As the sliding surfaces thereof are not caused to transmit any torsion, they are never subject to the compressive forces of such stresses which may sometimes arrive at rather large figures in the case of guides having a polygonal cross section or of slot-and-pin type guides.

According to the invention such a longitudinal spring may also be used for directly transmitting a torque as in the case of steering wheels the telescopic tubular guides of which at the same time also serve as steering knuckle pins.

A longitudinal spring of the character described may in practice have various shapes. Almost every principal known type of longitudinal springs may by suitable measures be rendered resistive to torsion within the length of the spring itself and the amount of compression thereof being adversely affected. In my patent application Serial No. 104,099, filed October 5, 1936, I have disclosed a number of types of torsion transmissive longitudinally flexible springs. For instance in the case of an ordinary helical spring a second helical spring wound in an opposite direction and having a smaller diameter may be inserted in the first named spring each turn of the inner spring being at two diametral points pivotally connected to the corresponding turn of the outside spring. Likewise the several members of the well-known Uerdingen type ring spring may by suitable serrations provided for on the conical bearing surfaces be prevented from angular displacement relatively to one another. Further the pneumatic helical-tube springs may readily be converted into twist resisting bodies by the fabric sleeves of the several turns thereof being rigidly connected to one another while the fabric is in itself as resistive as possible to torsion. Also the solid or annular cup type springs are well within the scope of the present invention the more so as the outline of the cross section transversely to the center line of the spring may readily be adapted to the irregular cross section, if any, of the tubular guide concerned. The members of such cup type springs having some resemblance to laminated springs may be rigidly connected to one another at a plurality of circumferential points of contact but the peripheries thereof may also be provided with notches and projections respectively which ensure their connection in a peripheral direction but permit of the spring being easily disassembled when necessary.

A particularly useful and novel type of such longitudinal springs is obtained in such a way that a spring steel tube of cylindrical or similar cross section is converted into a spring by slots machined into it transversely to its axis and which result in annular members connected to one another by studs left by milling and which are offset from member to member. A spring of this construction can be dimensioned in a particularly simple and clear manner as to its cross sections, which are determining its resistance to torsion, as well as to its force and deflection.

The invention may be further developed with a view to the longitudinal spring having different force at different points of its length. In the case of longitudinal springs composed of cup-like members, conical rings, etc., and of springs worked out from a spring steel tube the spring may, according to the invention, be converted into such a progressive spring adapted to resolve various problems and which is obtained by the cross sections of the members thereof being varied over the length of the spring with regard to depth and thickness and by the inside and outside diameters of the said spring being suitably increased or reduced.

Further features of the present invention will become apparent from the description of several embodiments thereof, reference being made to the drawing in which:

Fig. 1 shows, in a vertical longitudinal section, a spring support intended for supporting one of the running wheels and which is designed as a telescopic tubular guide provided with a longitudinal spring;

Fig. 2 shows a spring which is constructed as a progressive spring for the same purpose and Fig. 3 shows, on a smaller scale and in elevation, a spring the top and bottom portions only of which are springs proper while the central portion acts but as a rigid connecting member.

Fig. 4 is a side sectional view of a section of a modified form of spring having braking means provided with check valves.

In the approximately horizontal bearing bush $a$ there revolves the stud of the running wheel (not shown). This bush $a$ is rigidly connected to the housing sleeve $b$ or is made integral with the same. Into the thickened bottom end of the said housing sleeve $b$ there is screwed the stand tube $c$ which at its top end projects by a substantial distance above the said housing sleeve $b$. Over this stand tube $c$ extends the guiding cylinder $d$ which is rigidly connected to the transverse tube $e$ of the car body or frame. At its top end the said guiding cylinder $d$ is provided with an abutment collar $f$ which is in engagement with a two-part bearing bush $g, h$. A hollow spindle $i$ is inserted in this bearing bush $g, h$ and is prevented from rotation therein by a suitable serration. Above the bush $g, h$ the steering lever $k$ is secured to the hollow spindle $i$ by means of the same serration. Below the bearing bush $g, h$ the uppermost portion of the longitudinal spring $l$ is secured to the hollow spindle $i$ by means of the serration above referred to, and to this end its inside surface is correspondingly serrated. The other portions of the spring disposed below the said uppermost portion are guided by means of their inner surfaces on the outer surface of the hollow spindle $i$ as far as the point where the latter is substantially reduced in diameter, as at $m$. Starting from a point above $m$, the outside surfaces of the said spring members are guided along the inner wall of the stand tube $c$. The lowermost portion of the longitudinal spring $l$ is on its outside provided with a serration which is in engagement with a corresponding interior serration of the thickened bottom end of the stand tube $c$. A cap $n$ closes the bottom end of this stand tube $c$. This cap $n$ contains ball valves $o$ and the hollow space available between these balls is by the common bore $p$ in communication with the internal space of the tubular guide. Ducts $q$ normally closed by the ball valves $o$ lead to the outside of the stand tube $c$. This arrangement is intended for returning into the tubular guide the lubricant leaking to the outside of the stand tube $c$ and guiding cylinder $d$, the bellows $r$ covering the surfaces concerned.

The longitudinal spring $l$ is of uniform construction over its whole length and it is obtained by slots being milled into a solid spring steel tube in one plane from the left and from the right and in the next plane from before and from behind and so on, so as to be offset by 90 degrees in each following plane, the length of each slot being so proportioned that in each plane there are left two bridges or studs diametrically opposed. In the lower half of the longitudinal spring $l$ and in three places the annular space otherwise open is in the spring member concerned closed, apart from a small central opening, so as to result in a cup-like shape. These closing cups $s$ serve as brake disks during the compression and, naturally, also the expansion of the spring $l$. The braking effect is obtained in this instance by a braking liquid such as lubricating oil, within the tubular guide. In order that the braking effect progressively increases the lower tapered portion $m$ of the hollow spindle $i$ is so designed that the central openings of the brake disk cups $s$ are increasingly filled out by the tapered extension $m$ of the hollow spindle $i$ so as to gradually obstruct the passage of the braking liquid.

The bottom end of the extension $m$ of the hollow spindle carries a ball valve $t$ which is adapted to open towards the interior of the hollow spindle $i$ or its extension $m$ when subject to an over-pressure of the braking liquid while ordinarily it is closed by the pressure of a small spring. In this way when the tubular guide has been shoved together under compression of the longitudinal spring $l$, a small portion of the lubricating oil serving as a braking liquid will penetrate into the hollow spindle $i$ and gradually rise therein until the oil holes $u$ of the bearing bush $h$ have been arrived at when the rotating parts will be directly oiled at this point. The lubricating oil so pressed through the said holes will then run along the inside wall of the guiding cylinder $d$ and penetrate between the latter and the stand tube $c$ which members will be lubricated, and finally the oil will return in the way already described through the intermediary of the ball valves $o$ into the interior of the tubular guide.

As shown in Fig. 4, the central openings of the braking disk cups $s$ may also be provided with check valves which are adapted to permit the free passage of the braking liquid in one direction while during the return movement a very substantial braking effect is produced by the closure of these valves.

The modus operandi of the new type of spring when used as a longitudinal spring resistive to torsion is as follows: The steering lever $k$ being turned the hollow spindle $i$ will be taken along together with its bearing bush $g, h$ mounted in the collar $f$ and this movement will also result in an angular displacement of the longitudinal spring $l$ which is at its top end rigidly connected to the said hollow spindle *i*. The cross sections of the longitudinal spring *l* are so proportioned that the latter is able to take up the torsional stresses produced, without any practically appreciable deformation in the elastic range at any point of its length. The angular displacement accomplished by the steering lever *k* will thus be transmitted without reduction through the longitudinal spring *l* to the housing bush *b* mounted at the bottom end thereof and to the bush *a* which is rigidly connected to the said bush *c*. Thus the effect of the longitudinal spring is absolutely independent of the axial deflection thereof which is possible in spite of the double function of the said spring.

As the longitudinal spring is made, as shown by Fig. 1, from a solid spring steel tube, its shape may widely differ from the uniform and regular form illustrated in Fig. 1. So Fig. 2 shows a longitudinal spring *l* the upper portion of which comprises a plurality of sections having the same diameter and uniform pitch while the lower portion thereof comprises a plurality of sections the diameter and pitch of which gradually decrease towards the bottom end of the spring. Such a spring when taking up the shocks imparted to it has a progressive effect inasmuch as at first the lower and weaker members will be compressed until they come to bear against one another when the upper row of stronger members will be caused to take up the shocks still acting upon them. With the aid of the hydraulic braking arrangement shown by Fig. 1 it will then be possible to have the short and soft shock absorbed by the soft portion of the spring whereas the heavy or strong shock is absorbed by the spring as a whole and damped by the hydraulic brake while the spring oscillates in a lengthwise direction. A soft portion of the spring which is permanently subject to the load of the car then also permits of the single wheel support yielding downwards when a hole in the road is encountered. The uniformity of the material and the manufacture of such a longitudinal spring allows the attainment of deflections exactly in accordance with the cross sections provided for. On account of the smooth tube taken as a starting material for the springs the latter can be guided in a simple and reliable manner along the inside or outside or either annular surface of the several members.

Fig. 3 shows a longitudinal spring *l* the central part of which is replaced by a rod *v* the diameter of which is substantially smaller than the outside diameter of the spring proper so that in this place also other structural members may be arranged, such as the axle of the running wheel. It is also possible to leave this portion of the tube wall *w* without slots as shown by Fig. 3.

What I claim as my invention, is—

1. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, whereby lateral bending of the guide is prevented by the engagement of the telescopic portions of said members, and torsional movement between the ends of the guide is prevented by the spring and its connection with said members, but resilient longitudinal movement between the ends of said guide is permitted by the resilient yielding of the spring and the telescopic arrangement of the sleeve-like members.

2. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, said spring having a portion of less cross-sectional area than another portion thereof so that the spring has progressively increasing resistance to longitudinal flexure, whereby lateral bending of the guide is prevented by the engagement of the telescopic portions of said members, and torsional movement between the ends of the guide is prevented by the spring and its connection with said members, but resilient longitudinal movement of progressively increasing resistance between the ends of said guide is permitted by the resilient yielding of the spring and the telescopic arrangement of the sleeve-like members.

3. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, said spring consisting of a tube having peripherally extending slots spaced apart longitudinally of the guide and extending around said tube less than its entire peripheral extent leaving connecting studs between the sections of the spring tube formed by said slots, said studs being spaced peripherally around said tube relatively to adjacent studs, said spring tube having sections of less cross-sectional area than other sections thereof so that the spring has progressively increasing resistance to longitudinal flexure, whereby lateral bending of the guide is prevented by the engagement of the telescopic portions of said members, and torsional movement between the ends of the guide is prevented by the spring and its connection with said members, but resilient longitudinal movement of progressively increasing resistance between the ends of said guide is permitted by the resilient yielding of the spring and the telescopic arrangement of the sleeve-like members.

4. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, said spring consisting of a tube having peripherally extending slots spaced apart longitudinally of the guide and extending around said tube less than its entire periphery forming therebetween plate-like spring elements and leaving between the ends of said slots supports between the said elements, each of said supports being spaced peripherally around said spring tube relatively to the adjacent supports, said spring tube having sections of less cross-sectional area than other sections thereof so that the spring has progressively increasing resistance to longitudinal flexure, whereby lateral bending of the guide is prevented by the engagement of the telescopic portions of said members, and torsional movement between the ends of the guide is prevented by the spring and its connection with said members, but resilient longitudinal movement of progressively increasing resistance between the ends of said guide is permitted by the resilient yielding of the spring and the telescopic arrangement of the sleeve-like members.

5. A rectilinear guide resiliently yieldable axially but fixed against the lateral and torsional movement comprising a pair of sleeve-like tubular members having interfitting telescopically movable cylindrical portions extending axially of the guide for resisting lateral movement between said members, a spring flexible longitudinally and fixed against torsion between its ends located within and guided by the inner one of said tubular members, the extent of the longitudinal flexibility of said spring substantially corresponding to the intended extent of telescopic movement between said members, said spring being non-rotatably fixed at each of its ends to one of said members respectively, whereby lateral bending of the guide is prevented by the engagement of the telescopic portions of said members, and torsional movement between the ends of the guide is prevented by the spring and its connection with said members, but resilient longitudinal movement between the ends of said guide is permitted by the resilient yielding of the spring and the telescopic arrangement of the sleeve-like members.

6. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, said spring being of progressively decreasing external diameter longitudinally, so as to have progressively increasing resistance to longitudinal flexure, whereby lateral bending of the guide is prevented by the engagement of the telescopic portions of said members, and torsional movement between the ends of the guide is prevented by the spring and its connection with said members, but resilient longitudinal movement between the ends of said guide of progressively increasing resistance is permitted by the resilient yielding of the spring and the telescopic arrangement of the sleeve-like members.

7. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends nonrotatably connected with the two sleeves respectively, said spring having an unslotted, unyielding portion of substantial length rigidly connected to adjacent sections of the spring, the telescopic sleeves preventing lateral flexure of the guide while allowing longitudinal flexure, and the torsion resisting spring and its connections with the sleeve enabling transmission of torsional forces between the ends of the unit.

8. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends nonrotatably connected with the two sleeves respectively, said spring having an unslotted, unyielding cylindrical portion of substantial length integrally formed with adjacent sections of the spring, the telescopic sleeves preventing lateral flexure of the guide while allowing longitudinal flexure, and the torsion resisting spring and its connections with the sleeve enabling transmission of torsional forces between the ends of the unit.

9. A rectilinear guide resiliently yieldable axially but fixed against lateral and torsional movement comprising a pair of sleeve-like members having interfitting telescopically movable cylindrical portions extending axially of the guide for resisting lateral movement between said members, a spring flexible longitudinally and fixed against torsion between its ends intercalated between said members, the extent of the longitudinal flexibility of said spring substantially corresponding to the intended extent of telescopic movement between said members, said spring being non-rotatably fixed at each of its ends to one of said members respectively, said spring consisting of a tube having peripherally extending slots spaced apart longitudinally of the guide and extending around said tube less than its entire peripheral extent leaving connecting studs between the sections of the spring tube formed by said slots, said studs being spaced peripherally around said tube relatively to adjacent studs, said spring tube having sections of less cross-sectional area than other sections thereof so that the spring has progressively increasing resistance to longitudinal flexure, a spindle extending within the spring, some of the individual sections of the spring extending into engagement with said spindle, whereby lateral bending of the guide is prevented by the engagement of the telescopic portions of said members, and torsional movement between the ends of the guide is prevented by the spring and its connection with said members, but resilient longitudinal movement of progressively increasing resistance between the ends of said guide is permitted by the resilient yielding of the spring and the telescopic arrangement of the sleeve-like members.

10. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends non-rotatably connected with the two sleeves respectively, said spring having some of its individual sections extending into engagement with the shell, the telescopic sleeves preventing lateral flexure of the guide while allowing longitudinal flexure, and the torsion resisting spring and its connections with the sleeve enabling transmission of torsional forces between the ends of the unit.

11. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends non-rotatably connected with the two sleeves respectively, said shell containing liquid, some of the sections of the spring being provided with constrictions through which the liquid must pass during longitudinal flexure of the unit whereby shock absorbing, motion damping action is obtained, the telescopic sleeves preventing lateral flexure of the guide while allowing longitudinal flexure, and the torsion resisting spring and its connections with the sleeve enabling transmission of torsional forces between the ends of the unit.

12. A spring guide unit yieldable only axially comprising, a spring formed of a tube having sections formed by pairs of oppositely disposed slots extending peripherally less than the circumference of the tube thus leaving connecting studs, the slots being longitudinally spaced along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends non-rotatably connected with the two sleeves respectively, said shell containing liquid, some of the sections of the spring being provided with constrictions through which the liquid must pass during longitudinal flexure of the unit, and damping members fixed relative to one end of the unit cooperating with said constrictions to increase the damping action after a predetermined longitudinal flexure, the telescopic sleeves preventing lateral flexure of the guide while allowing longitudinal flexure, and the torsion resisting spring and its connections with the sleeve enabling transmission of torsional forces between the ends of the unit.

13. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends non-rotatably connected with the two sleeves respectively, said shell containing liquid, some of the sections of the spring being provided with constrictions through which the liquid must pass during longitudinal flexure of the unit, and damping members fixed relative to one end of the unit cooperating with said constrictions, said damping members having variable cross sections longitudinally to vary the motion damping effect at different points in the longitudinal flexure of the unit, the telescopic sleeves preventing lateral flexure of the guide while allowing longitudinal flexure, and the torsion resisting spring and its connections with the sleeve enabling transmission of torsional forces between the ends of the unit.

14. A spring guide unit yieldable only axially comprising, a spring formed of a tube having sections formed by pairs of oppositely disposed slots extending peripherally less than the circumference of the tube thus leaving connecting studs, the slots being longitudinally spaced apart along the tube and the connecting studs being angularly disposed around the tube relative to the studs of adjacent slots, whereby the spring is yieldable longitudinally and unyielding torsionally and a pair of telescopic sleeves constituting a shell encompassing said spring, said spring having its ends non-rotatably connected with the two sleeves respectively, said shell containing liquid, some of the sections of the spring being provided with constrictions through which the liquid must pass during longitudinal flexure of the unit whereby shock absorbing, motion damping action is obtained, said sections being provided with check valves for the constrictions operating differently in different directions of flexure, the telescopic sleeves preventing lateral flexure of the guide while allowing longitudinal flexure, and the torsion resisting spring and its connections with the sleeve enabling transmission of torsional forces between the ends of the unit.

FRIEDRICH EUGEN MAIER.